US011215213B2

(12) United States Patent
Ulsamer et al.

(10) Patent No.: US 11,215,213 B2
(45) Date of Patent: Jan. 4, 2022

(54) ATTACHMENT DEVICE (71) Applicant: ILLINOIS TOOL WORKS INC., Glenview, IL (US)

(72) Inventors: Klaus Ulsamer, Rottingen (DE); Jochen Beck, Creglingen (DE)

(73) Assignee: ILLINOIS TOOL WORKS INC., Glenview, IL (US)

(*) Notice: Subject to any disclaimer, the term of this patent is extended or adjusted under 35 U.S.C. 154(b) by 0 days.

(21) Appl. No.: 16/769,016

(22) PCT Filed: Dec. 3, 2018

(86) PCT No.: PCT/US2018/063578
§ 371 (c)(1),
(2) Date: Jun. 2, 2020

(87) PCT Pub. No.: WO2019/112940
PCT Pub. Date: Jun. 13, 2019

(65) Prior Publication Data
US 2020/0340515 A1 Oct. 29, 2020

(30) Foreign Application Priority Data
Dec. 5, 2017 (DE) ...................... 10 2017 128 814.7

(51) Int. Cl.
F16B 21/07 (2006.01)
F16B 21/08 (2006.01)
F16B 5/06 (2006.01)
(52) U.S. Cl.
CPC ............ *F16B 21/073* (2013.01); *F16B 5/065* (2013.01); *F16B 21/086* (2013.01)

(58) Field of Classification Search
CPC ....... F16B 21/073; F16B 21/086; F16B 5/065
See application file for complete search history.

(56) References Cited

U.S. PATENT DOCUMENTS 5,606,784 A 3/1997 Hamamoto
8,677,573 B2 * 3/2014 Lee ...................... F16B 21/076
24/297

(Continued)

FOREIGN PATENT DOCUMENTS

CN 103635701 A 3/2014
CN 106471264 A 3/2017

(Continued)

OTHER PUBLICATIONS

PCT, International Search Report and Written Opinion, International Application No. PCT/US2018/063578; dated Mar. 19, 2019, 13 pages.

*Primary Examiner* — Robert Sandy
(74) *Attorney, Agent, or Firm* — Thompson Hine LLP (57) ABSTRACT An attachment device for attaching a component to a support component, in particular a support component of a vehicle, includes a retaining element which can be inserted into an opening of the support component and which has a latching feature for releasably latching to the opening of the support component. A locking element can be inserted into the retaining element, wherein, when the locking element is inserted into the retaining element, the latching feature of the retaining element is/are blocked so as to prevent release of the latching. The retaining element has a sealing ring for bearing in a sealing manner against the opening of the support component, which sealing ring, when inserted into the opening of the support component, bears in a sealing manner against opposite sides of the support component.

17 Claims, 7 Drawing Sheets (56) References Cited

U.S. PATENT DOCUMENTS 10,408,248 B1* 9/2019 Safry .................. F16B 5/0628
2017/0152948 A1 6/2017 Huebner

FOREIGN PATENT DOCUMENTS

| | | |
|---|---|---|
| DE | 102016203141 A1 | 8/2017 |
| JP | 2001221214 | 8/2001 |
| WO | WO 2009109272 A1 | 9/2009 |
| WO | WO 2015187239 A1 | 12/2015 |

* cited by examiner

ATTACHMENT DEVICE

TECHNICAL FIELD

The invention relates to an attachment device for attaching a component to a support component, in particular a support component of a vehicle, comprising a retaining element which can be inserted into an opening of the support component and which has latching means for releasably latching to the opening of the support component, and comprising a locking element that can be inserted into the retaining element, wherein, when the locking element is inserted into the retaining element, the latching means of the retaining element are blocked so as to prevent release of the latching.

BACKGROUND

By means of attachment devices of the type mentioned above, for example, components are attached to support components of vehicles, such as passenger motor vehicles or trucks. The support components may be, for example, parts of a wheel house or a sill. The components may be, for example, trim components.

In order to attach trim parts to wheel houses, adhesives which are applied in a strip-like manner are known. For a reliable attachment, however, these adhesives require a clean and smooth bearing surface onto which the component may be pushed with sufficient force. If an adhesively bonded connection is produced which is not secure over the entire adhesively bonded surface, this leads to an insufficient seal and corrosion due to substances which promote corrosion. This constitutes a particular problem in the case of components which are to be attached in the external region of a vehicle. Moreover, incorrect bonding of the component also leads to reduced retaining forces.

Clips are known as attachment devices and attachment devices comprising a grommet to be inserted into an opening of the support component, and into which a screw is inserted for the attachment, are also known. The assembly using an additional screw is costly. Moreover, during operation these attachment devices do not always provide a reliable seal and thus sufficient protection against corrosion.

SUMMARY

Proceeding from the prior art described above, the object of the invention is to provide an attachment device of the type mentioned in the introduction which by means of simple assembly achieves a reliable seal of the opening of the support component at all times.

For an attachment device of the type mentioned in the introduction, the invention achieves the object in that the retaining element has a sealing ring for bearing in a sealing manner against the opening of the support component, which ring, when inserted into the opening of the support component, bears in a sealing manner against opposite sides of the support component.

The support component may be a support component of a vehicle, such as a passenger motor vehicle or a truck. The support component, for example, may be a wheel house support component or a sill component of the vehicle. The component to be attached to the support component may, for example, be a trim component. The support component may, in particular, be arranged in the external region of the vehicle where it is subjected to dirt and moisture. The support component may, for example, be a metal component. The component may, for example, be a plastics component.

The attachment device according to the invention comprises a retaining element and a locking element that can be inserted into the retaining element. The retaining element and the locking element may be separate elements. However, it is also conceivable that the retaining element and the locking element may be elements which are integrally connected during a production process. This integral connection may become released, for example broken, during the course of assembly, in particular during the relative movement thereof when inserting the locking element into the retaining element. The retaining element and/or the locking element may consist of plastics. The production of the retaining element and/or the locking element, for example, is possible in an injection-molding method. Moreover, the sealing ring may be attached to the retaining element in an injection-molding method, in particular in a two-component injection-molding method.

The locking element has a closed base and closed side walls. In the fully assembled state an interface is present between the retaining element and the opening of the support component which has to be protected against the penetration of dirt and moisture. According to the invention, this interface is reliably sealed by the sealing ring, by said sealing ring bearing in the region of the opening, in contrast to the prior art described in the introduction, in that two opposing sides, thus in particular an outer side and an inner side, bear against the support component. The sealing ring in this case bears in a sealing manner over the entire periphery against the surface of the support component defining the opening. In the state of the locking element fully inserted into the retaining element, the locking element may also press the sealing ring against the support component, whereby the seal is further improved. According to the invention, the risk of corrosion is minimized.

In the prior art described above using a clip and/or a grommet and a screw, however, in each case a seal bears against only one outer side of the support component. As a result, a reliable protection against corrosion is not always sufficiently ensured. The embodiment according to the invention comprising a retaining element which is releasably latched to the support component and a locking of the retaining element against release by inserting the locking element into the retaining element permits, on the one hand, simple (pre)-assembly of the retaining element, wherein the sealing ring is partially pushed through the opening of the support component. In the prior art described in the introduction this is difficult, since in this case the clip or the grommet have to be pushed through the opening with substantially greater assembly force, since the clip or the grommet alone have to provide the retaining force in the assembled state. In the invention, however, reduced assembly forces may be used for pushing in the retaining element, since after inserting the retaining element locking is produced by the locking element. These reduced assembly forces permit the insertion of the sealing ring into the opening according to the invention, so that said sealing ring bears against the support component from opposing sides. At the same time, the lower assembly forces result in a secure locking of the retaining element and high retaining forces.

The assembly of the attachment device according to the invention is possible in a particularly simple manner, merely by pushing the attachment device into the opening of the support component. No additional attachment means, such as screws or the like, are required beyond the retaining element and the locking element. In particular, therefore, the attachment device may merely comprise the retaining element and the locking element. Due to the particularly good seal, it might even be possible to attach the attachment device according to the invention to the support component before applying an anti-corrosion coating onto the support component.

According to one embodiment, the locking element and/or the retaining element may have connection means that connect the locking element to the retaining element when the former is fully inserted into the retaining element. The connection means ensure that in the state fully inserted into the retaining element the locking element does not inadvertently become released from the retaining element. The connection means may be, for example, latching means.

For example, the retaining element and the locking element may have corresponding latching projections and/or latching receivers. However, it is also possible for the locking element to be connected to the retaining element by a press fit therein.

According to a further embodiment, the locking element and/or the retaining element have pre-connection means that pre-connect the locking element to the retaining element when the former is partially inserted into the retaining element. By the pre-connection means, a pre-assembly of the locking element in the retaining element is possible and this permits, for example, secure delivery of the pre-connected retaining element and the locking element to an assembly point. In turn, latching means may be considered, for example, as pre-connection means. For example, the retaining element and the locking element may also have corresponding latching projections and/or latching receivers. However, it is also possible that the locking element is pre-connected to the retaining element by a releasable press fit therein. It may be provided that in the pre-connected state the locking element does not substantially block an elastic movement of the latching means of the retaining element, so that by elastic deformation of the latching means the retaining element may be inserted in the opening of the support component and latched thereto. The retaining forces provided by the pre-connection means may be selected, in particular, such that when the pre-connected attachment device is pushed on, the retaining element is initially inserted into the opening of the support component by elastic deformation of the latching means, before the locking element is pushed (further) into the retaining element and thus the attachment device is locked to the support component.

According to a further embodiment, the retaining element may have, as latching means, multiple elastic resilient limbs which, when the retaining element is inserted into the opening of the support component, releasably latch to the opening of the support component. The locking element may have at least one locking section which, when the locking element is inserted into the retaining element, prevents an inward movement of the elastic resilient limbs. The elastic resilient limbs engage behind the opening of the support component. During the course of the insertion, the elastic resilient limbs are elastically deformed inwardly so that they pass through the opening. After passing through the opening, the elastic resilient limbs are deformed back outwardly in order to engage behind the opening. It is also possible that the elastic resilient limbs are pushed outwardly by the locking section of the locking element by elastic deformation and retained in this outwardly pushed position. On the one hand, the locking is reinforced thereby. On the other hand, the sealing ring may be pressed thereby against the support component. The elastic resilient limbs may be distributed, for example, equally over the periphery of the retaining element. For example, four or more than four elastic resilient limbs, such as six or eight elastic resilient limbs, may be provided. By means of the elastic resilient limbs, a particularly simple assembly is implemented by the elastic resilient limbs being pushed into the opening of the support component. At the same time, disassembly is possible and a secure retention is produced with high retaining forces.

According to a further embodiment, the sealing ring may form a U-shaped profile in cross section. The sealing ring may form a U-shaped profile, in particular, substantially over the entire periphery. A particularly good seal is produced by means of the U-shaped profile, since in the region of the opening of the support component the sealing ring bears against opposing sides of the support component and also bears against the edge of the support component defining the opening.

According to a further embodiment, when the locking element is fully inserted into the retaining element, the sealing ring also bears in a sealing manner against the locking element. As a result, a further improved seal is achieved since the interface between the locking element and the retaining element is also reliably sealed. The sealing ring in this case bears in a sealing manner over the entire periphery against the locking element. Insofar as this application refers to a sealing ring, this sealing ring may be configured integrally. However, it is also possible that the sealing ring is configured from a plurality of annular sections, for example, configured separately from one another. For example, the annular section of the sealing ring bearing against the support component could be configured separately from the section of the sealing ring bearing against the locking element.

The sealing ring may consist of a hot-melt adhesive material. Such a hot-melt adhesive material is liquefied by the action of heat and then sealingly bears against the support component and optionally the locking element, so that in the subsequently recooled and hardened state a particularly reliable seal is achieved. The action of heat may be carried out, for example, during the course of an oven treatment during the assembly of a vehicle.

According to a further embodiment, the locking element has retaining means for retaining the component. The retaining means, for example, may be latching means. This permits simple assembly and disassembly of the component on and/or from the support component. The latching means may comprise, for example, latching hooks which latch with corresponding latching hooks of the component. To this end, the latching hooks of the component may be inserted, for example, into the locking element. However, other retaining means are also conceivable.

According to a further particularly expedient embodiment, the locking element may be of pot-shaped design. For example, retaining means for retaining the component may be arranged in the pot.

According to a further embodiment, the retaining element may comprise an opening in a wall portion as well as a sealing element, being opposed to the opening of the locking element, preferably in the locked state when the locking element is inserted into the retaining element, configured to seal the opening.

As a result, the seal is improved by the openings present in the locking element. Preferably, the sealing element is sealed by the sealing element continuously bearing against the edge of the opening. Preferably, the sealing element and the sealing ring are produced by injection-molding and the sealing element forms a skirt extending from the sealing ring. Preferably, the sealing element is made of the same material as the sealing ring. For example, the sealing element may also be injection-molded onto the retaining element in a two-component injection-molding method, preferably in the same injection-molding step as the sealing ring. Preferably, the retaining element has an opening on two sides and on the second side a sealing element also correspondingly opposes the opening. Preferably, the respective wall portion comprises the opening at the free end of the latching hook.

The invention further relates to a system consisting of a support component having an opening, in particular a support component of a vehicle, and a component attached to the support component by means of an attachment device according to the invention. The system may, in particular, relate to the fully assembled state of the component on the support component. As already mentioned above, the support component may be a support component of a vehicle, such as a passenger motor vehicle or truck. In addition, as already mentioned above, the support component may be a wheel house support component or a sill component of a vehicle, for example. The component may be a trim component, for example. The support component may be arranged, in particular, in the external region of the vehicle. In addition, as already mentioned above, the support component may be a metal component, for example. The component may be a plastics component, for example.

BRIEF DESCRIPTION OF THE DRAWINGS

An exemplary embodiment of the invention is described in more detail hereinafter with reference to the figures, in which schematically:

FIGS. 8-15 show a second attachment device according to the invention based on the attachment device shown in FIGS. 1-7, wherein the individual FIGS. 1-7 and 8-14 in each case show comparable states, i.e. FIG. 8 as in FIG. 1, FIG. 2 as in FIG. 2, FIG. 10 as in FIG. 3, FIG. 11 as in FIG. 4, FIG. 12 as in FIG. 5, FIG. 13 as in FIG. 6, FIG. 14 as in FIG. 7 and FIG. 15 an oblique view into the retaining part 10.

Unless indicated otherwise, the same reference numerals denote the same objects in the figures.

DETAILED DESCRIPTION

Figure 1:
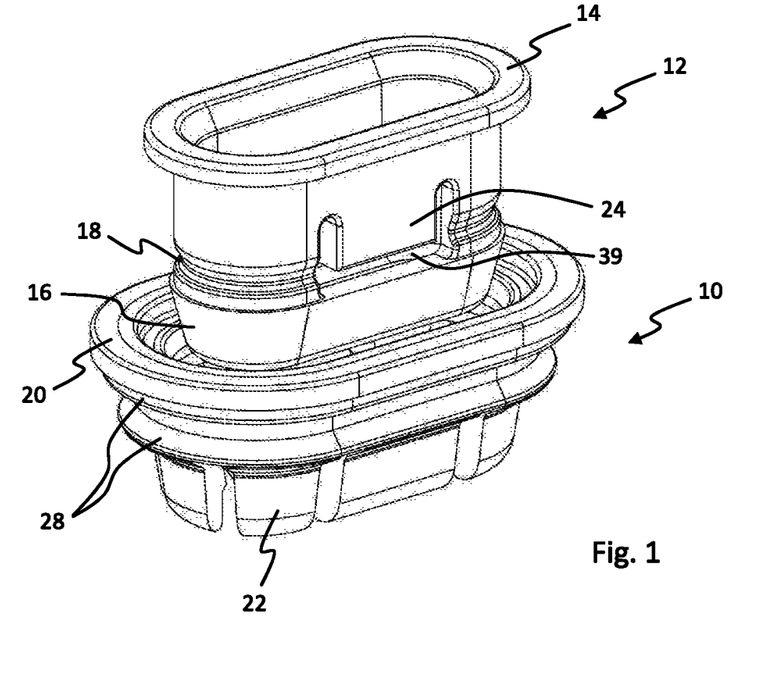
FIG. 1 shows an attachment device according to the invention before assembly in a perspective view.
Figure 2:
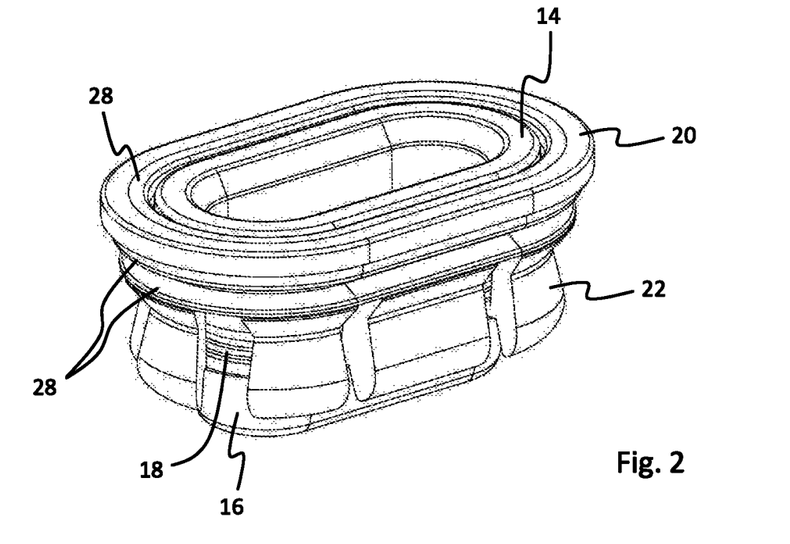
FIG. 2 shows the attachment device of FIG. 1 when the locking element is inserted into the retaining element in a perspective view.

The attachment device according to the invention shown in FIGS. 1 and 2 comprises a retaining element 10 and a locking element 12 which may be inserted into the retaining element 10. In the example shown, the locking element 12 has an elongated pot shape with a closed base and closed side walls. In FIG. 1 the side walls extend from an edge section 14 downwardly to the base. The end of the locking element 12 remote from the edge section 14 forms a locking section 16 tapering in the direction of the base of the locking element 12. An annular groove 18 circulating around the periphery of the locking element 12 may be identified above the locking section 16. A wall portion of the locking element 12, to be identified in FIG. 1 by the reference numeral 24, forms in the example shown an elastic latching hook 26 facing the inner side of the locking element 12 (see FIG. 7). The wall portion 24 comprises an opening 39 on the free end of the latching hook 26.

The retaining element 10 also comprises an edge section 20 which defines a receiver for the locking element 12 corresponding to the pot shape of the locking element 12. At the end remote from the edge section 20, the retaining element 10 has multiple elastic resilient limbs 22. In the example shown, the elastic resilient limbs 22 are distributed over the periphery of the retaining element 10. In the example, the retaining element 10 has eight elastic resilient limbs 22. Naturally, the retaining element could also have or multiple elastic resilient limbs 22. A sealing ring 28 is integrally formed on the retaining element 10. The sealing ring 28 is arranged, on the one hand, below the edge section 20 and, on the other hand, on the inner side of the edge section 20.

In the example shown, the retaining element 10 and the locking element 12 in each case consist of a plastics material. In the example shown, the sealing ring 28 consists of a hot-melt adhesive material. For example, the sealing ring may be injection-molded onto the retaining element 10 in a two-component injection-molding method.

Figure 3:
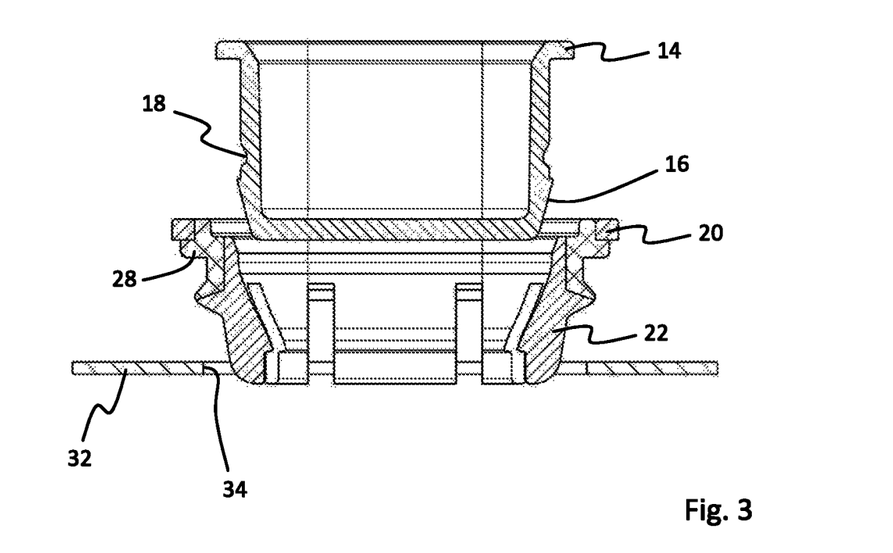
FIG. 3 shows the attachment device shown in FIGS. 1 and 2 in a first operating state in a sectional view.
Figure 4:
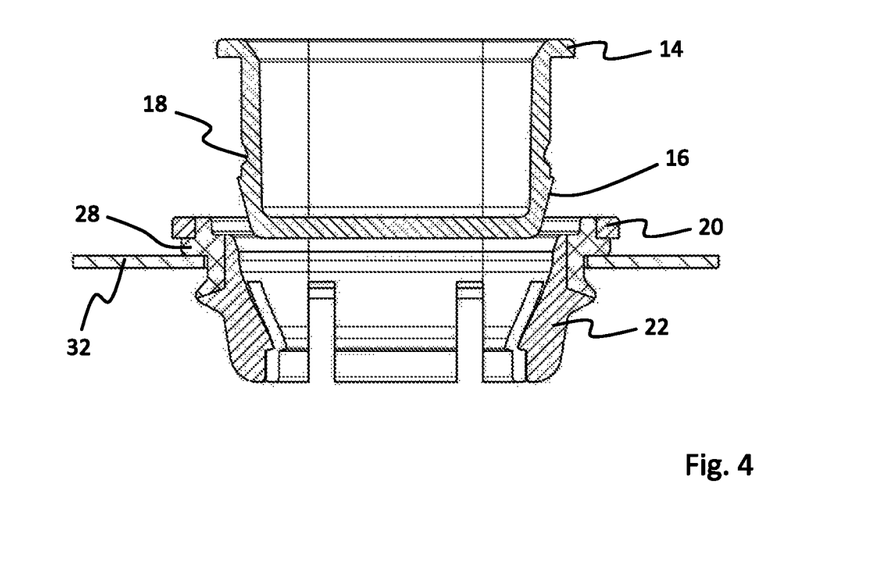
FIG. 4 shows the view of FIG. 3 in a second operating state.
Figure 5:
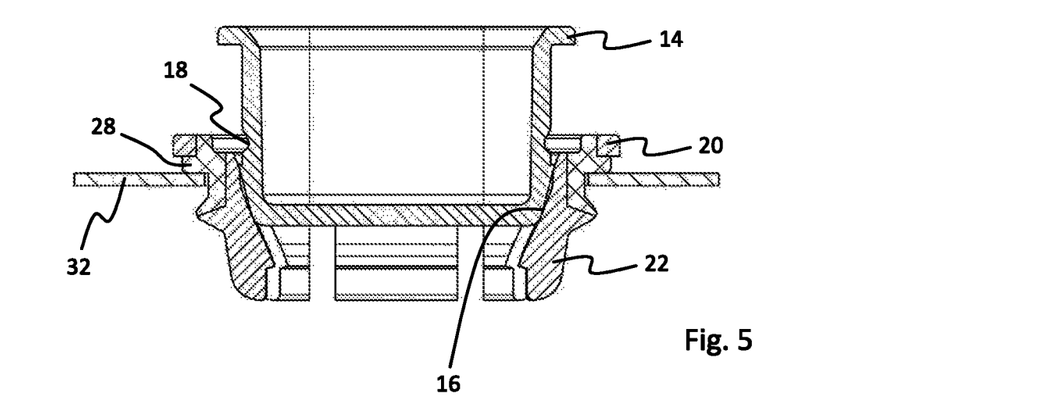
FIG. 5 shows the view of FIG. 3 in a third operating state.
Figure 6:
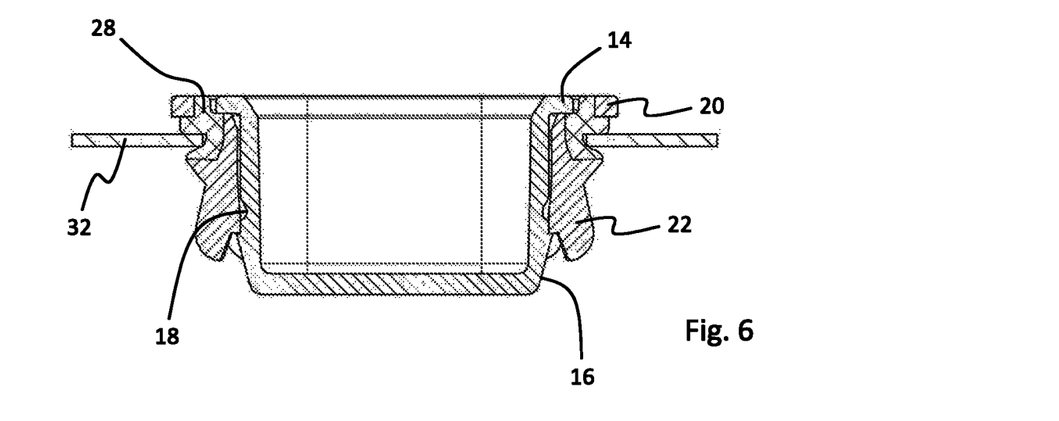
FIG. 6 shows the view of FIG. 3 in a fourth operating state.

The assembly of the attachment device on a support component 32, for example a support component 32 of a vehicle such as a passenger motor vehicle or truck, is to be described with reference to FIGS. 3 to 6. For the assembly of the attachment device the support component 32 consisting, for example, of a metal material, has a correspondingly elongated opening 34 which is adapted to the contour of the attachment device in the example shown. In FIG. 3, the attachment device is shown before insertion into the opening 34 of the support component 32. If the attachment device is inserted further into the opening 34, from the operating state shown in FIG. 3, this initially results in the elastic resilient limbs 22 being elastically deformed inwardly when these limbs pass through the opening 34. After passing through the opening 34 the elastic resilient limbs are deformed back outwardly, so that these limbs engage behind the opening 34 and correspondingly latch the retaining element 10 to the opening 34 as shown in FIG. 4. In the state shown in FIG. 4, the retaining element 10 is able to be released again from the opening 34 by corresponding elastic deformation of the elastic resilient limbs 22. Proceeding from the state shown in FIG. 4, if the locking element 12 is inserted further into the retaining element 10, the locking section 16 comes into contact with the inner surfaces of the elastic resilient limbs 22, which also taper in the resting position in the direction of insertion of the locking element 12, as may be identified in FIG. 5. In this state, the sealing ring 28 with its annular section arranged on the inner side of the edge section 20 is introduced into the annular groove 18 of the locking element 12. The contact between the locking section 16 and the inner surfaces of the elastic resilient limbs 22 prevents an elastic inward bending of the elastic resilient limbs 22. Due to the shape of the locking section 16 and the inner surfaces of the elastic resilient limbs 22, with a further introduction of the locking element 12 into the retaining element 10 as far as a fully inserted state, as shown in FIG. 6, this leads to the elastic resilient limbs 22 being forced apart and thus a secure locking of the attachment device on the opening 34 of the support component 32. Moreover, by the elastic resilient limbs 22 being bent apart, this leads to the sealing ring 28 being pressed against the opposing sides of the support component 32, in FIG. 6 the upper side and the lower side in the region of the opening 34. As may also be identified in the figures, the sealing ring 28 has a U-shaped cross section. As a result, the sealing ring 28 also bears against the edge defining the opening 34. The sealing ring 28 thus reliably seals the interface between the retaining element 10 and the opening 34 of the support component 32. At the same time, the sealing ring 28 bears in a sealing manner against the lower side of the edge section 14 of the locking element 12 and thus reliably seals the interface between the locking element and the retaining element 10.

Figure 7:
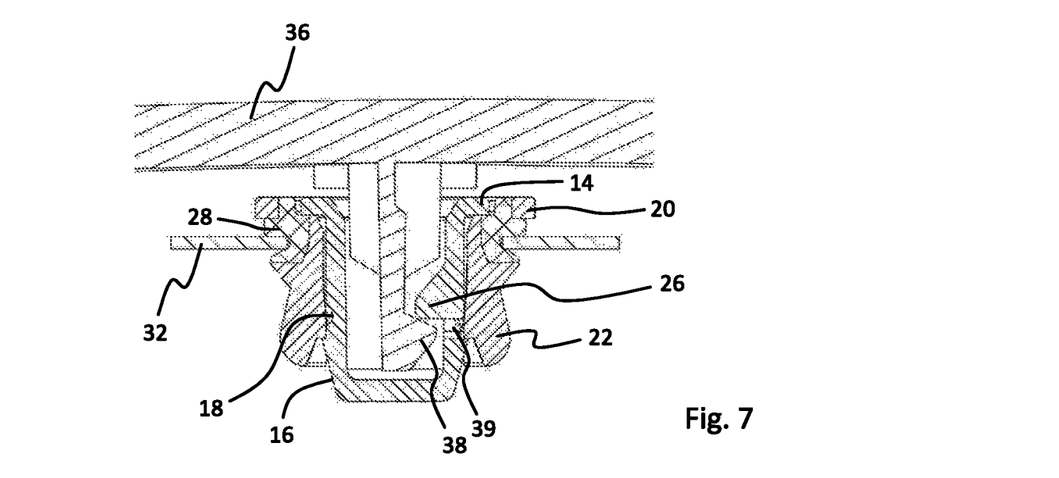
FIG. 7 shows the view of FIG. 6 in a sectional view rotated relative to FIG. 6 by 90° in a component attached to a support component.
Figure 8:
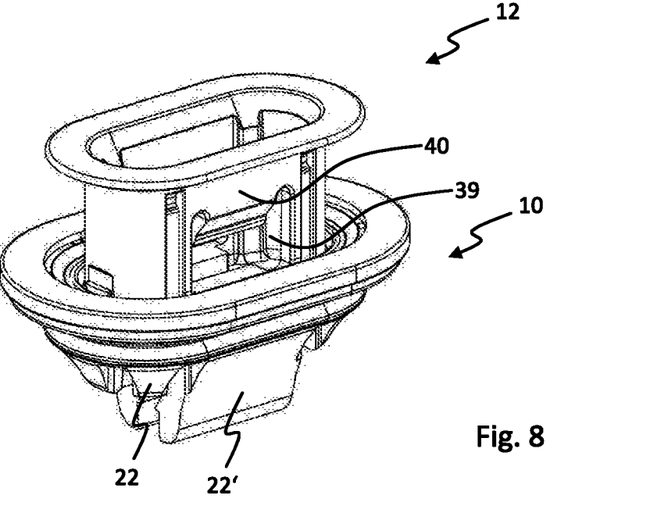
Figure 9:
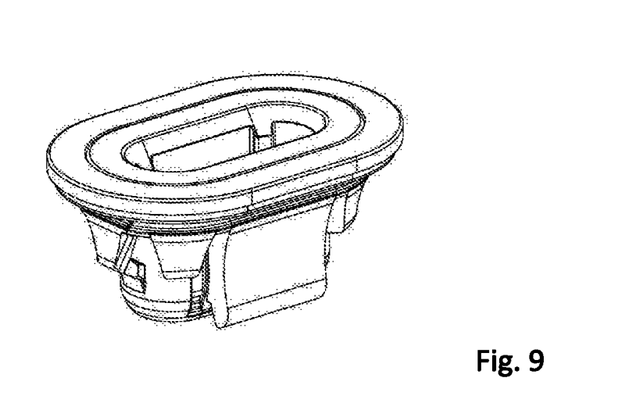
Figure 10:
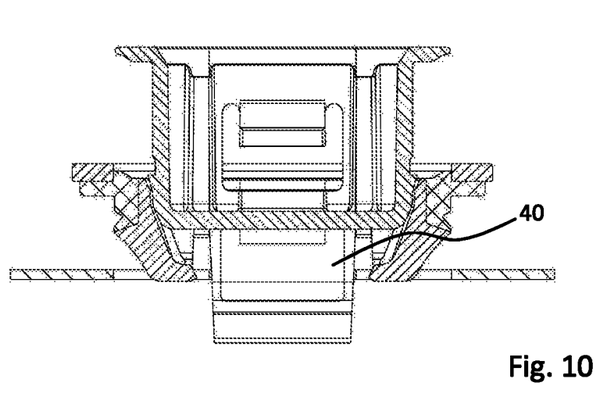
Figure 11:
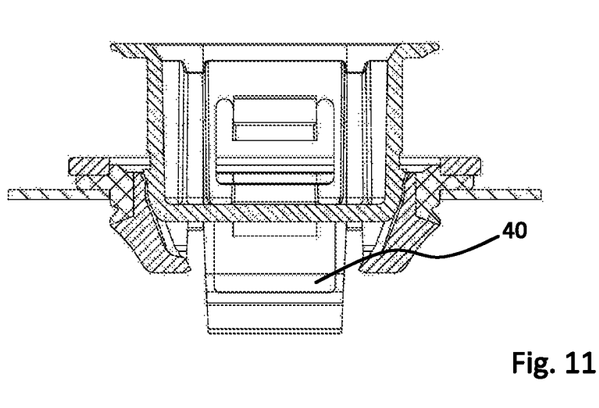
Figure 12:
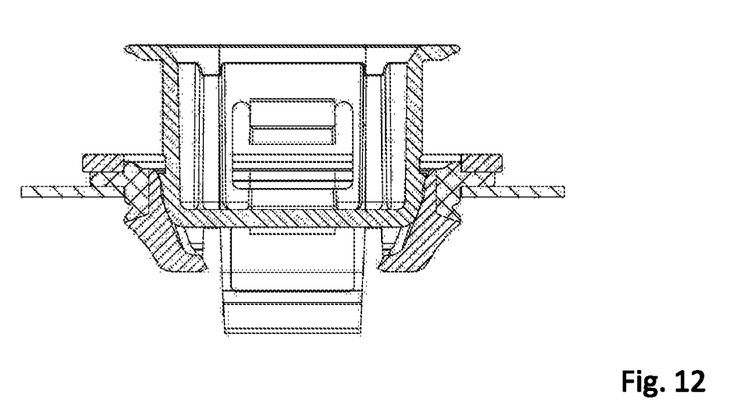
Figure 13:
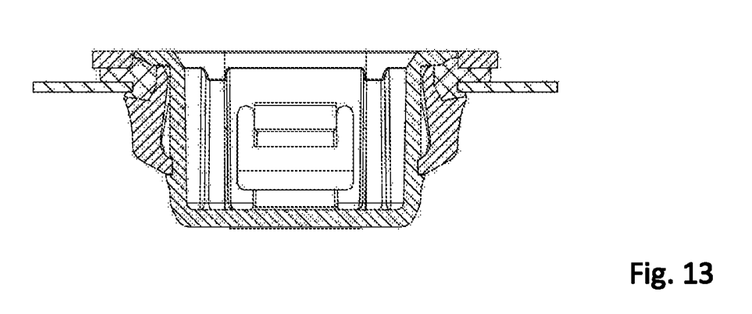
Figure 14:
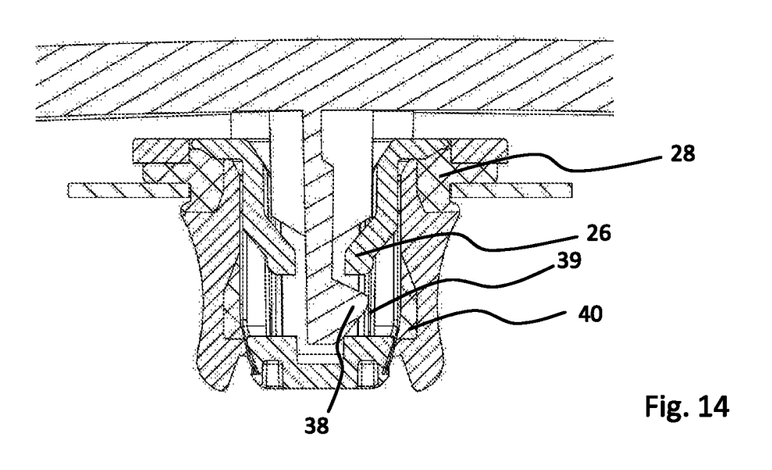
Figure 15:
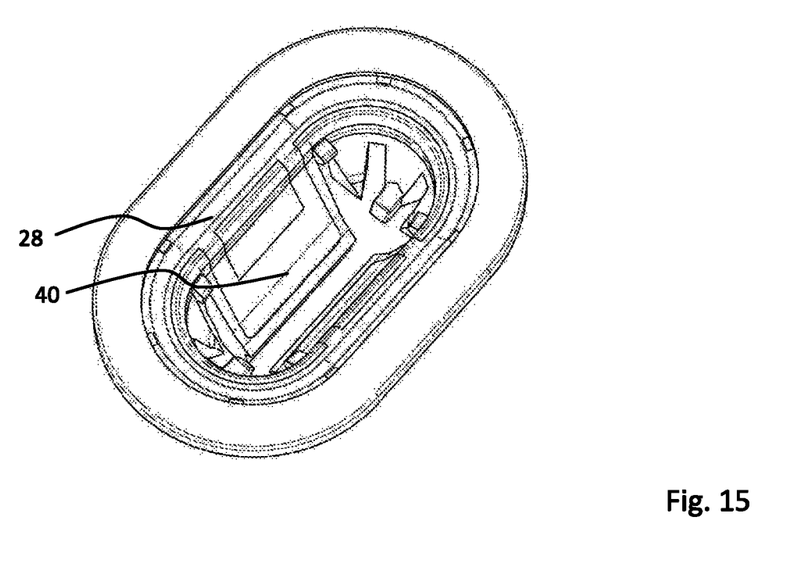

A sectional view rotated by 90° relative to the sectional views of FIGS. 3 to 6 is shown in FIG. 7. The latching hook 26 of the locking element 12 described above may be identified in this rotated view. Moreover, a component to be attached to the support component 32, for example a trim component, may be identified by the reference numeral 36. The component 36 has an elastic latching hook 38 corresponding to the latching hook 26 of the locking element 12. For attaching the component 36 to the component 32, the elastic latching hook 38 of the component 36 is inserted into the locking element 12, wherein the elastic latching hook 38 engages by elastic deformation behind the latching hook 26, as may be identified in FIG. 7. In this state, the component 36 is attached to the attachment device and thus to the support component 32. Disassembly is also possible by releasing the latching between the latching hooks 26, 38.

A description of FIG. 8 to FIG. 15 follows. The components are similar to the above figures—for reasons of clarity the reference numerals are repeated only occasionally here—however the assignment is the same unless indicated otherwise. In contrast to FIG. 1 to FIG. 7, the elastic resilient limbs 22 of the retaining element 10 have different lengths. Here elastic resilient limbs 22' are present which are wider and longer than the other elastic resilient limbs 22. Additionally, the retaining element 10 comprises a sealing element 40 which in the locked state opposes the opening 39 of the locking element 12 and which is designed to seal the opening 39, in this case by the sealing element 40 continuously bearing against the edge of the opening 39. Here the sealing element 40 and the sealing ring 28 are produced by injection-molding and the sealing element 40 forms a skirt extending from the sealing ring 28. The sealing element 40 is made from the same material as the sealing ring 28. Here the sealing element is injection-molded on the retaining element 10 in a two-component injection-molding method, in the same injection-molding step as the sealing ring 28 which here is also injection-molded on the retaining element 10 in a two-component injection-molding method. Here the retaining element 10 comprises an opening 39 on two sides and on the second side a sealing element 40 also correspondingly opposes the opening.

LIST OF REFERENCE NUMERALS

10 Retaining element
12 Locking element
14 Edge section
16 Locking section
18 Annular groove
20 Edge section
22 Elastic resilient limbs
24 Wall portion
26 Latching hook
28 Sealing ring
32 Support component
34 Opening
36 Component
38 Latching hook
39 Opening
40 Sealing element

The invention claimed is:

1. An attachment device for attaching a component (36) to a support component (32), comprising:
a retaining element (10) which can be inserted into an opening (34) of the support component (32) and which has latching means for releasably latching to the opening (34) of the support component (32), and a locking element (12) that can be inserted into the retaining element (10), wherein, when the locking element (12) is inserted into the retaining element (10), the latching means of the retaining element (10) are blocked so as to prevent release of the latching, wherein the retaining element (10) has a sealing ring (28) for bearing in a sealing manner against the opening (34) of the support component (32), wherein, when the retaining element (10) is inserted into the opening (34) of the support component (32), the sealing ring (28) bears in a sealing manner against opposite sides of the support component (32), wherein the latching means of the retaining element (10) includes multiple elastic resilient limbs (22) which, when the retaining element (10) is inserted into the opening (34) of the support component (32), releasably latch to the opening (34) of the support component (32), and wherein the locking element (12) has at least one locking section (16) which, when the locking element (12) is inserted into the retaining element (10), prevents an inward movement of the elastic resilient limbs (22).

2. The attachment device as claimed in claim 1, wherein the locking element (12) and/or the retaining element (10) have connection means that connect the locking element (12) to the retaining element (10) when the former is fully inserted into the retaining element (10).

3. The attachment device as claimed claim 2, wherein the locking element (12) and/or the retaining element (10) have pre-connection means that pre-connect the locking element (12) to the retaining element (10) when the former is partially inserted into the retaining element (10).

4. The attachment device as claimed in claim 1, wherein the locking element comprises an opening in a wall portion, and the retaining element comprises a sealing element being opposed to the opening when the locking element is inserted into the retaining element, the sealing element being configured to seal the opening.

5. The attachment device as claimed in claim 1, wherein the sealing ring (28) forms a U-shaped profile in cross section.

6. The attachment device as claimed in claim 1, wherein, when the locking element (12) is fully inserted into the retaining element (10), the sealing ring (28) also bears in a sealing manner against the locking element (12).

7. The attachment device as claimed in claim 1, wherein the sealing ring (28) consists of a hot-melt adhesive material.

8. The attachment device as claimed in claim 1, wherein the locking element (12) has retaining means for retaining the component (36).

9. The attachment device as claimed in claim 8, wherein the retaining means are latching means.

10. The attachment device as claimed in claim 1, wherein the locking element (12) is of pot-shaped design.

11. The attachment device as claimed in claim 1, wherein the locking element (12) comprises an opening (39) in a wall portion (24), and the retaining element (10) comprises a sealing element (40) being opposed to the opening (39) when the locking element (12) is inserted into the retaining element, the sealing element (40) being configured to seal the opening (39).

12. A system consisting of a support component (32) having an opening (34), and a component (36) attached to the support component (32) by an attachment device as claimed in claim 1.

13. An attachment device for attaching a component to a support component, comprising:
a retaining element insertable into an opening of the support component and having latches for releasably latching to the opening of the support component;
a locking element insertable into the retaining element, wherein, when the locking element is inserted into the retaining element, the latches of the retaining element are blocked so as to prevent release of the latches;
wherein the retaining element includes a sealing ring for bearing in a sealing manner against the opening of the support component, wherein the sealing ring, when inserted into the opening of the support component, bears in a sealing manner against opposite sides of the support component, wherein the sealing ring consists of a hot-melt adhesive material.

14. The attachment device as claimed in claim 13, wherein the locking element is connected to the retaining element when the locking element is fully inserted into the retaining element.

15. The attachment device as claimed in claim 14, wherein the locking element is connected to the retaining element when the locking elements is partially inserted into the retaining element.

16. An attachment device for attaching a component to a support component, comprising:
a retaining element insertable into an opening of the support component and having latches for releasably latching to the opening of the support component;
a locking element insertable into the retaining element, wherein, when the locking element is inserted into the retaining element, the latches of the retaining element are blocked so as to prevent release of the latches;
wherein the retaining element includes a sealing ring for bearing in a sealing manner against the opening of the support component, wherein the sealing ring, when inserted into the opening of the support component, bears in a sealing manner against opposite sides of the support component;
wherein the locking element has retaining means for retaining the component.

17. The attachment device as claimed in claim 16, wherein the retaining means are latching means.

* * * * *